(12) United States Patent
Xue et al.

(10) Patent No.: US 11,647,500 B2
(45) Date of Patent: May 9, 2023

(54) TRANSMITTING BEAM SCHEDULES TO AND RECEIVING BEAM SCHEDULES FROM SIDELINK USER EQUIPMENTS

(71) Applicant: QUALCOMM Incorporated, San Diego, CA (US)

(72) Inventors: Yisheng Xue, San Diego, CA (US); Xiaoxia Zhang, San Diego, CA (US); Chih-Hao Liu, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/444,257

(22) Filed: Aug. 2, 2021

(65) Prior Publication Data

US 2023/0036146 A1 Feb. 2, 2023

(51) Int. Cl.
*H04W 4/00* (2018.01)
*H04W 72/12* (2023.01)
*H04W 72/1263* (2023.01)

(52) U.S. Cl.
CPC ... *H04W 72/1278* (2013.01); *H04W 72/1263* (2013.01)

(58) Field of Classification Search
CPC ......... H04W 72/1278; H04W 72/1263; H04W 72/14
See application file for complete search history.

(56) References Cited

U.S. PATENT DOCUMENTS

| | | | |
|---|---|---|---|
| 11,050,543 B1 * | 6/2021 | Balasubramanian | ........................ H04L 5/0023 |
| 2020/0029340 A1 | 1/2020 | He et al. | |
| 2020/0374858 A1 * | 11/2020 | Vargas | .................. H04W 16/28 |
| 2020/0383097 A1 * | 12/2020 | Laghate | ................ H04W 16/28 |
| 2021/0160778 A1 * | 5/2021 | Ji | .......................... H04L 5/0044 |
| 2021/0352625 A1 * | 11/2021 | Akkarakaran | ........ H04L 5/0023 |
| 2021/0409166 A1 * | 12/2021 | Wang | ..................... H04W 72/14 |
| 2022/0022188 A1 * | 1/2022 | Sakhnini | ................. H04L 5/001 |
| 2022/0039076 A1 * | 2/2022 | Choi | ..................... H04B 7/0695 |
| 2022/0046430 A1 * | 2/2022 | Liu | ........................ H04W 24/10 |
| 2022/0159583 A1 * | 5/2022 | Wang | ..................... H04W 52/54 |

(Continued)

FOREIGN PATENT DOCUMENTS

| | | | | |
|---|---|---|---|---|
| WO | WO-2020213986 A1 * | 10/2020 | .......... | H04L 1/0061 |
| WO | 2020227850 A1 | 11/2020 | | |
| WO | 2021034572 A1 | 2/2021 | | |

OTHER PUBLICATIONS

International Search Report and Written Opinion—PCT/US2022/073278—ISA/EPO—dated Oct. 12, 2022.

*Primary Examiner* — Chi H Pham
*Assistant Examiner* — Elisabeth Benoit Magloire
(74) *Attorney, Agent, or Firm* — Harrity & Harrity, LLP

(57) ABSTRACT

Various aspects of the present disclosure generally relate to wireless communication. In some aspects, a first sidelink user equipment (UE) may transmit, to a second sidelink UE via sidelink control information (SCI), a receiving (Rx) beam schedule indicating Rx beams associated with the first sidelink UE in a set of slots, wherein the Rx beam schedule indicates that the first sidelink UE is configured to tune to the Rx beams in the set of slots for possible sidelink receptions. The first sidelink UE may receive, from the second sidelink UE, a sidelink transmission using an Rx beam indicated in the Rx beam schedule. Numerous other aspects are described.

30 Claims, 15 Drawing Sheets

(56) References Cited

U.S. PATENT DOCUMENTS

| | | | |
|---|---|---|---|
| 2022/0167180 A1* | 5/2022 | Choi | H04W 56/001 |
| 2022/0174774 A1* | 6/2022 | Tseng | H04W 72/1263 |
| 2022/0201760 A1* | 6/2022 | Ozturk | H04L 1/08 |
| 2022/0225117 A1* | 7/2022 | Dutta | H04W 16/28 |
| 2022/0338202 A1* | 10/2022 | Kim | H04W 72/085 |
| 2022/0345901 A1* | 10/2022 | Wang | H04W 72/02 |
| 2022/0394697 A1* | 12/2022 | Kim | H04B 7/06 |

* cited by examiner

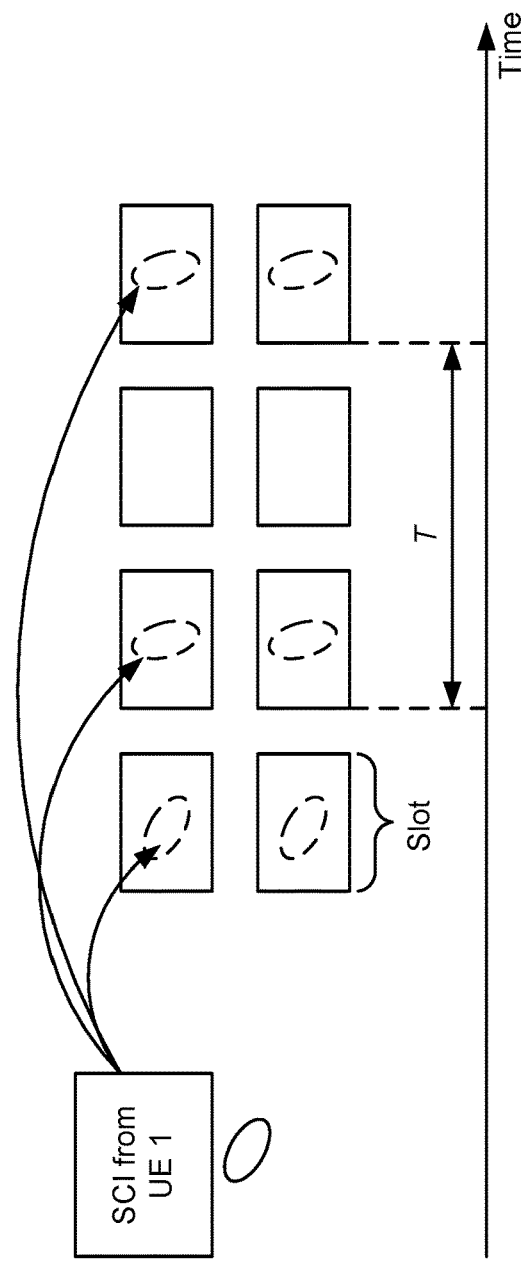
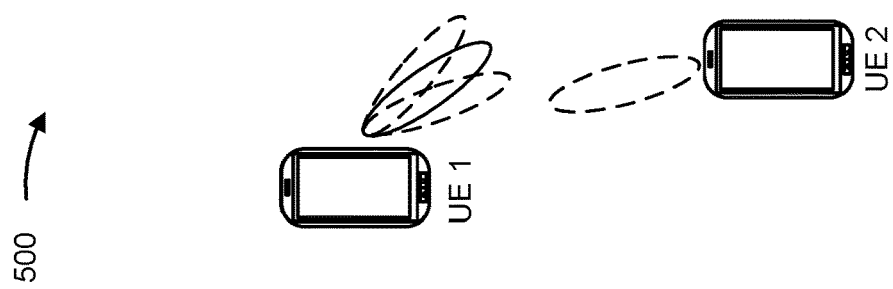
FIG. 5

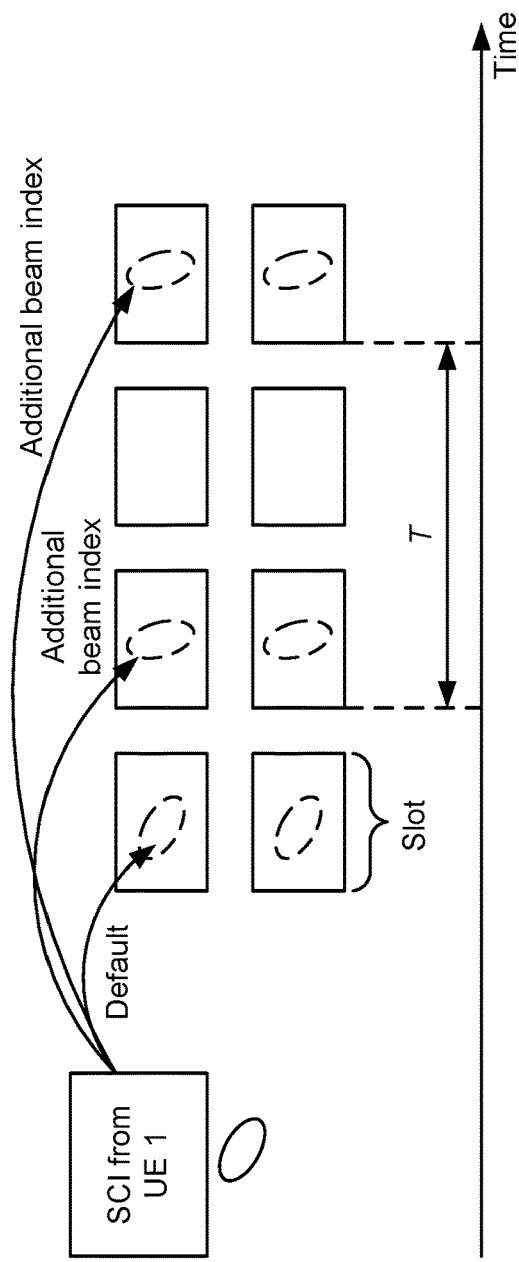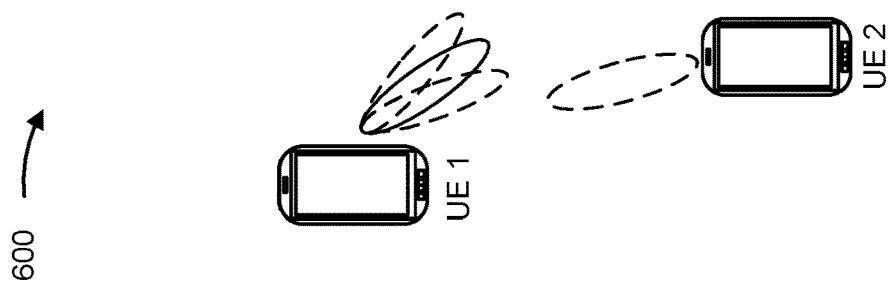
FIG. 6

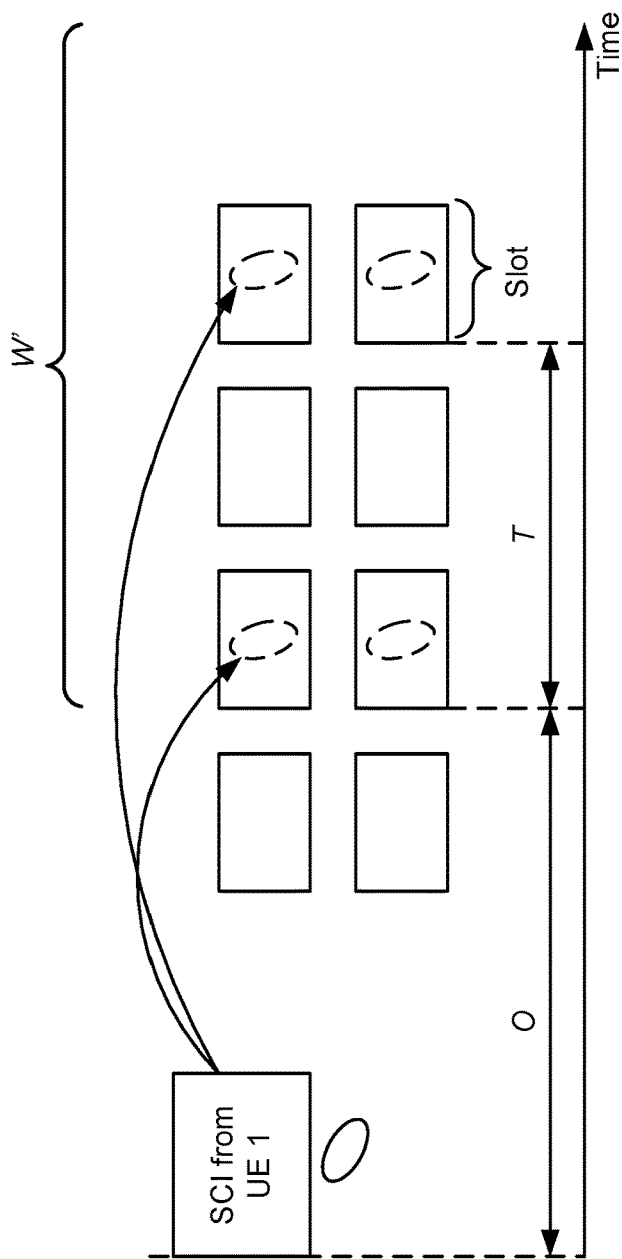
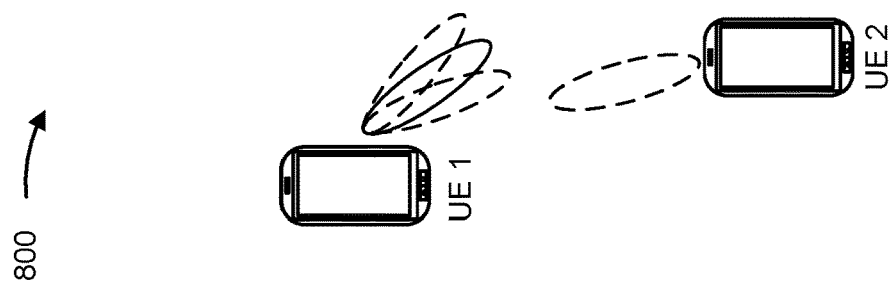
FIG. 8

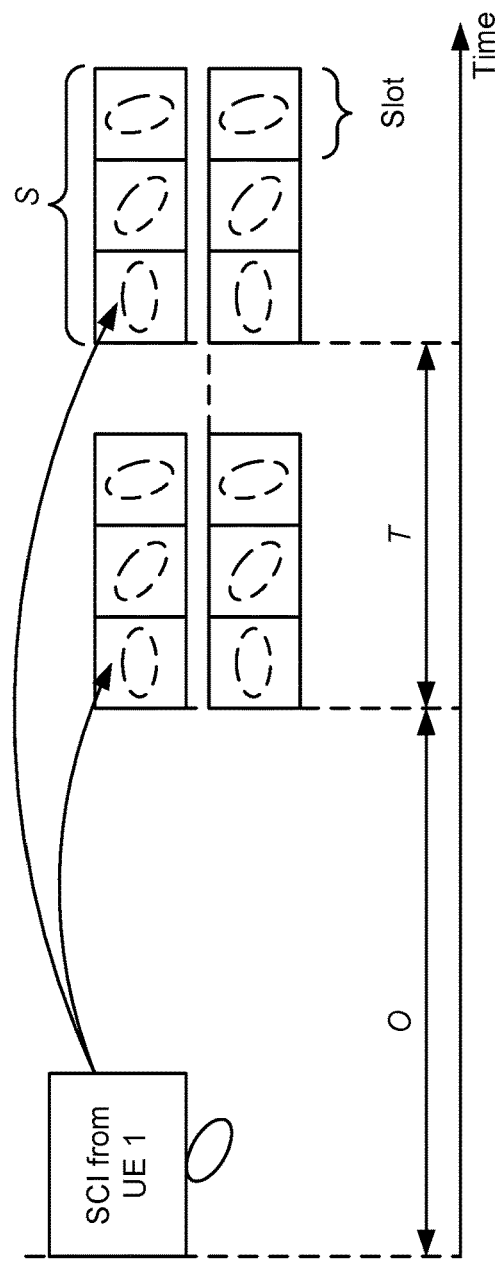
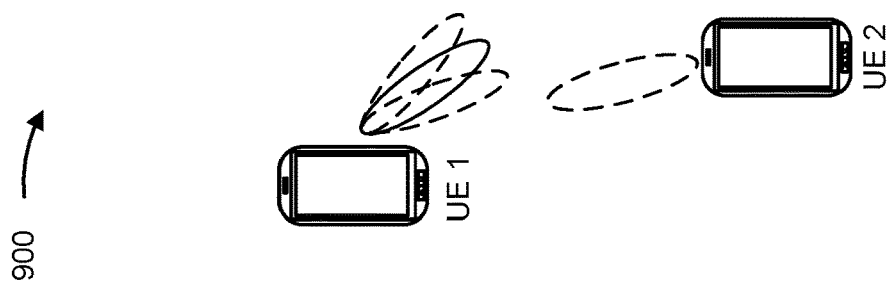
FIG. 9

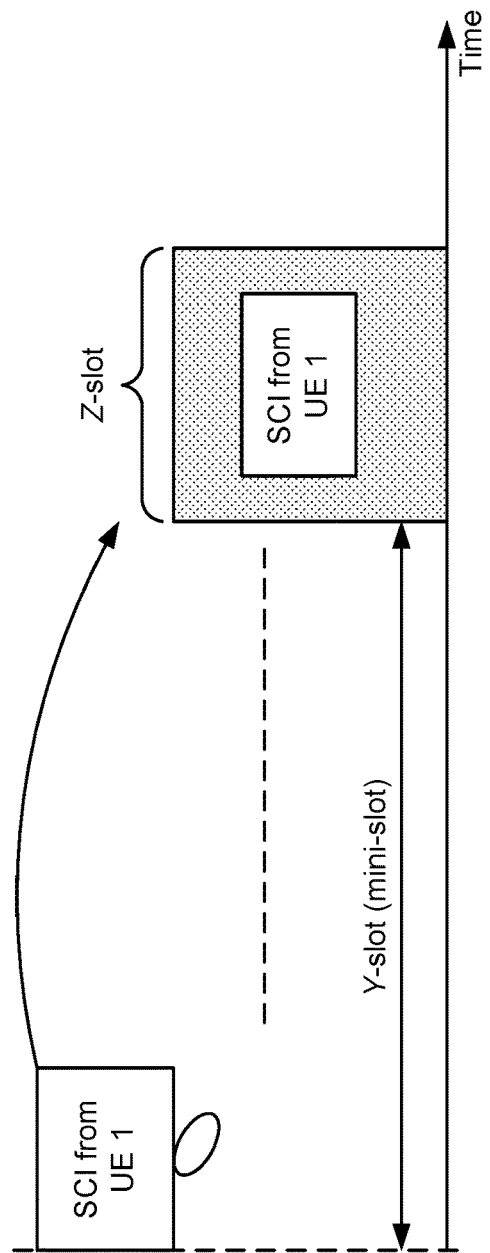
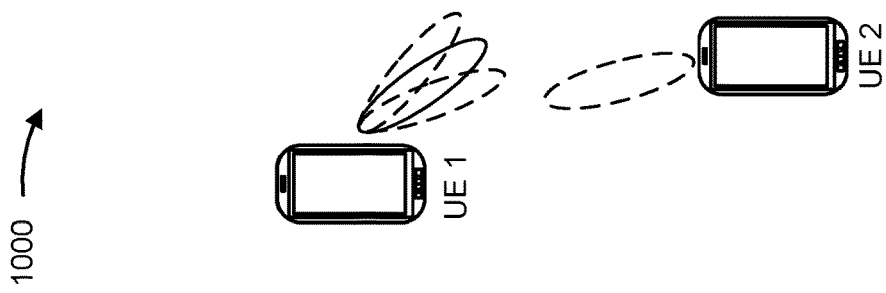
FIG. 10

TRANSMITTING BEAM SCHEDULES TO AND RECEIVING BEAM SCHEDULES FROM SIDELINK USER EQUIPMENTS

FIELD OF THE DISCLOSURE

Aspects of the present disclosure generally relate to wireless communication and to techniques and apparatuses for transmitting receiving (Rx) beam schedules to sidelink user equipments (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a first sidelink user equipment (UE) includes a memory and one or more processors, coupled to the memory, configured to: transmit, to a second sidelink UE via sidelink control information (SCI), a receiving (Rx) beam schedule indicating Rx beams associated with the first sidelink UE in a set of slots, wherein the Rx beam schedule indicates that the first sidelink UE is configured to tune to the Rx beams in the set of slots for possible sidelink receptions; and receive, from the second sidelink UE, a sidelink transmission using an Rx beam indicated in the Rx beam schedule.

In some implementations, an apparatus for wireless communication at a second sidelink UE includes a memory and one or more processors, coupled to the memory, configured to: receive, from a first sidelink UE via SCI, an Rx beam schedule indicating Rx beams associated with the first sidelink UE in a set of slots; and transmit, to the first sidelink UE, a sidelink transmission using an Rx beam indicated in the Rx beam schedule.

In some implementations, a method of wireless communication performed by a first sidelink UE includes transmitting, to a second sidelink UE via SCI, an Rx beam schedule indicating Rx beams associated with the first sidelink UE in a set of slots, wherein the Rx beam schedule indicates that the first sidelink UE is configured to tune to the Rx beams in the set of slots for possible sidelink receptions; and receiving, from the second sidelink UE, a sidelink transmission using an Rx beam indicated in the Rx beam schedule.

In some implementations, a method of wireless communication performed by a second sidelink UE includes receiving, from a first sidelink UE via SCI, an Rx beam schedule indicating Rx beams associated with the first sidelink UE in a set of slots; and transmitting, to the first sidelink UE, a sidelink transmission using an Rx beam indicated in the Rx beam schedule.

In some implementations, a non-transitory computer-readable medium storing a set of instructions for wireless communication includes one or more instructions that, when executed by one or more processors of a first sidelink UE, cause the first sidelink UE to: transmit, to a second sidelink UE via SCI, an Rx beam schedule indicating Rx beams associated with the first sidelink UE in a set of slots, wherein the Rx beam schedule indicates that the first sidelink UE is configured to tune to the Rx beams in the set of slots for possible sidelink receptions; and receive, from the second sidelink UE, a sidelink transmission using an Rx beam indicated in the Rx beam schedule.

In some implementations, a non-transitory computer-readable medium storing a set of instructions for wireless communication includes one or more instructions that, when executed by one or more processors of a second sidelink UE, cause the second sidelink UE to: receive, from a first sidelink UE via SCI, an Rx beam schedule indicating Rx beams associated with the first sidelink UE in a set of slots; and transmit, to the first sidelink UE, a sidelink transmission using an Rx beam indicated in the Rx beam schedule.

In some implementations, a first apparatus for wireless communication includes means for transmitting, to a second apparatus via SCI, an Rx beam schedule indicating Rx beams associated with the first apparatus in a set of slots, wherein the Rx beam schedule indicates that the first apparatus is configured to tune to the Rx beams in the set of slots for possible sidelink receptions; and means for receiving, from the second apparatus, a sidelink transmission using an Rx beam indicated in the Rx beam schedule.

In some implementations, a second apparatus for wireless communication includes means for receiving, from a first apparatus via SCI, an Rx beam schedule indicating Rx beams associated with the first apparatus in a set of slots; and means for transmitting, to the first apparatus, a sidelink transmission using an Rx beam indicated in the Rx beam schedule.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4-5 are diagrams illustrating examples associated with transmitting an Rx beam schedule, in accordance with the present disclosure.

FIG. 6 is a diagram illustrating an example associated with transmitting an Rx beam schedule that indicates a default beam index and an additional beam index, in accordance with the present disclosure.

FIG. 8 is a diagram illustrating an example associated with transmitting a periodic Rx beam schedule, in accordance with the present disclosure.

FIG. 9 is a diagram illustrating an example associated with transmitting a periodic Rx beam schedule that indicates beam sweeping, in accordance with the present disclosure.

FIG. 10 is a diagram illustrating an example associated with transmitting a periodic Rx beam schedule that indicates an availability of a next periodic Rx beam schedule, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
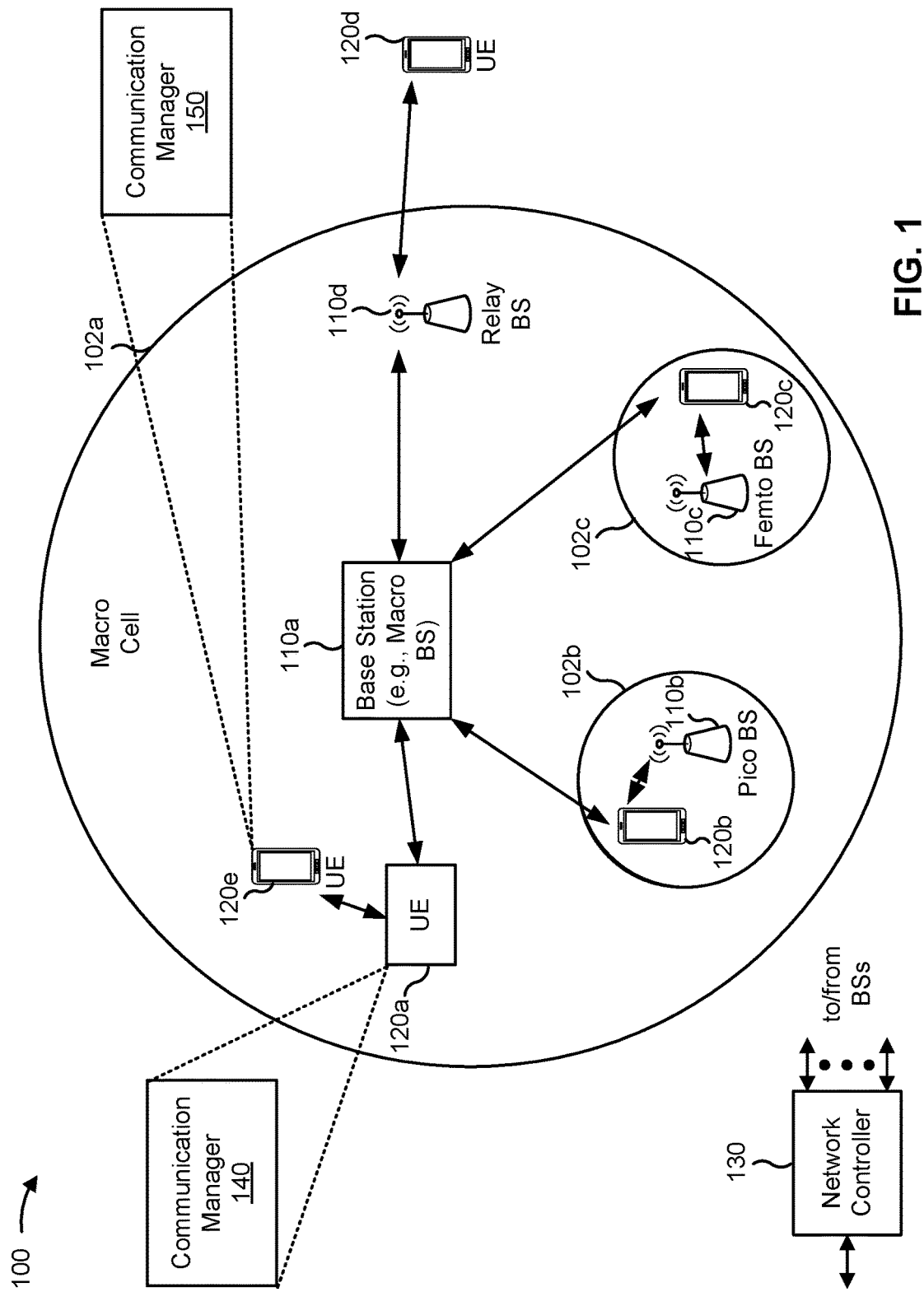
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first sidelink UE (e.g., UE 120a) may include a communication manager 140. As described in more detail elsewhere herein, the communication manager 140 may transmit, to a second sidelink UE via sidelink control information (SCI), a receiving (Rx) beam schedule indicating Rx beams associated with the first sidelink UE in a set of slots, wherein the Rx beam schedule indicates that the first sidelink UE is configured to tune to the Rx beams in the set of slots for possible sidelink receptions; and receive, from the second sidelink UE, a sidelink transmission using an Rx beam indicated in the Rx beam schedule. Additionally, or alternatively, the communication manager 140 may perform one or more other operations described herein.

In some aspects, a second sidelink UE (e.g., 120e) may include a communication manager 150. As described in more detail elsewhere herein, the communication manager 150 may receive, from a first sidelink UE via SCI, an Rx beam schedule indicating Rx beams associated with the first sidelink UE in a set of slots; and transmit, to the first sidelink UE, a sidelink transmission using an Rx beam indicated in the Rx beam schedule. Additionally, or alternatively, the communication manager 140 may perform one or more other operations described herein.

As indicated above, FIG. 1 is provided as an example. Other examples may differ from what is described with regard to FIG. 1.

Figure 2:
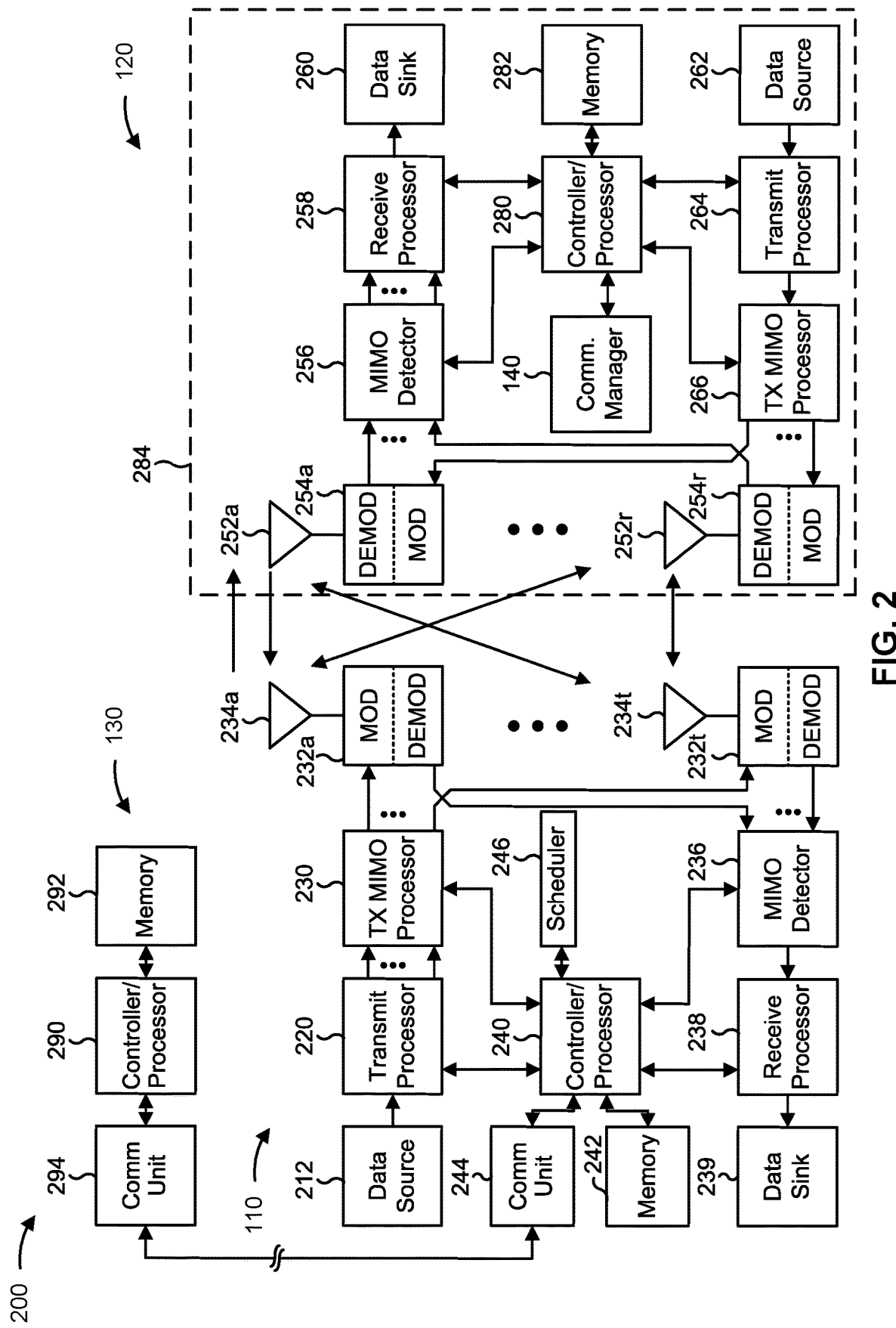
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-15).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-15).

The controller/processor 240 of the base station 110, the controller/processor 280 of the UE 120, and/or any other component(s) of FIG. 2 may perform one or more techniques associated with transmitting Rx beam schedules to sidelink UEs, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a first sidelink UE (e.g., UE 120a) includes means for transmitting, to a second sidelink UE via SCI, an Rx beam schedule indicating Rx beams associated with the first sidelink UE in a set of slots, wherein the Rx beam schedule indicates that the first sidelink UE is configured to tune to the Rx beams in the set of slots for possible sidelink receptions; and/or means for receiving, from the second sidelink UE, a sidelink transmission using an Rx beam indicated in the Rx beam schedule. The means for the first sidelink UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second sidelink UE (e.g., UE 120e) includes means for receiving, from a first sidelink UE via SCI, an Rx beam schedule indicating Rx beams associated with the first sidelink UE in a set of slots; and/or means for transmitting, to the first sidelink UE, a sidelink transmission using an Rx beam indicated in the Rx beam schedule. The means for the second sidelink UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

NR sidelink may be applicable for various use cases, such as V2X (or V2V) use cases, in which safety-related messages may be exchanged between nearby sidelink UEs (e.g., vehicle UEs). NR sidelink may operate in a sub-6 GHz licensed band or in other bands. In NR sidelink, two resource radio allocation/channel access modes may be defined. Mode 1 may be associated with an in-coverage deployment, in which a sidelink UE may receive a grant from a base station for channel access. Mode 2 may be associated with an autonomous deployment, in which a sidelink UE may use sensing to perform a distributed channel access.

In NR sidelink, each sidelink channel access may include a coupled physical sidelink control channel (PSCCH) and a physical sidelink shared channel (PSSCH), which may occupy at least one subchannel and carry one transport block of data. The PSCCH may carry first stage sidelink control information (SCI-1), which may include control information regarding decoding the PSSCH. The SCI-1 may indicate a resource occupancy to facilitate a sensing-based collision avoidance in the Mode 2. For dynamic channel access, the SCI-1 may indicate a tentative occupancy of one or two upcoming channel accesses. In other words, the SCI-1 may indicate a reservation of the one or two upcoming channel accesses. The SCI-1 may indicate control information to reserve a periodic channel access at an upcoming time.

In NR sidelink, the sidelink UE may perform blind SCI decoding when the sidelink UE is not performing transmissions. The sidelink UE may mitigate half-duplex deafness by performing retransmissions with random inter-Tx intervals.

NR sidelink may be applicable to other vertical domains, such as public safety. The Mode 2 may support discontinuous reception (DRX) and partial sensing, which may be useful for UEs powered by batteries. A reliability of the Mode 2 may be improved by using inter-UE coordination.

Developments in NR sidelink have mainly focused on the sub-6 GHz licensed band. However, certain vertical domains cannot access the sub-6 GHz licensed band. On the other hand, 6 GHz and 60 GHz unlicensed bands have available bandwidth for NR sidelink deployments. Beamforming alignment may be needed for NR sidelink deployments over these higher frequency bands (including millimeter wave bands) due to relatively large propagation losses associated with these higher frequency bands. Beam unalignment deafness may occur in addition to the half-duplex deafness, which may present a challenge to mitigation schemes for the half-duplex deafness that involve performing the retransmissions with the random inter-Tx intervals.

Figure 3:
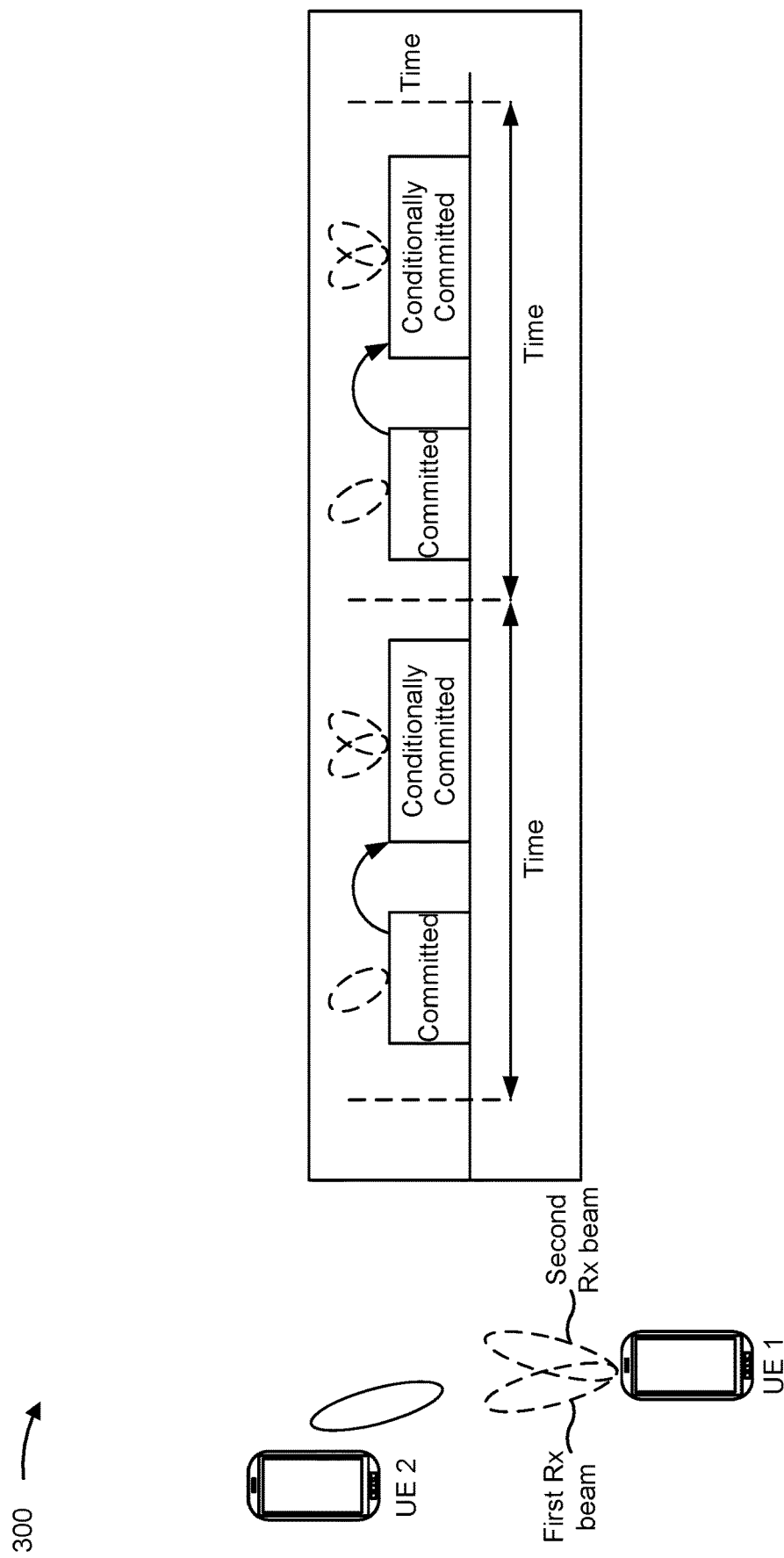
FIG. 3 is a diagram illustrating an example of defining a receiving (Rx) beam schedule for unicast, in accordance with the present disclosure.

FIG. 3 is a diagram illustrating an example 300 of defining a receiving (Rx) beam schedule for unicast, in accordance with the present disclosure.

A first sidelink UE (UE 1) may use an Rx beam schedule to tune specific Rx beam(s) to correctly receive a PSCCH and a PSSCH transmitted by a second sidelink UE (UE 2). The first sidelink UE may use a first Rx beam to receive a transmission (e.g., a PSCCH transmission and/or a PSSCH transmission) from the second sidelink UE. The first sidelink UE may switch to a second Rx beam, from time to time, to receive transmissions (e.g., broadcast transmissions) from other sidelink UEs. The first sidelink UE may not receive a transmission from the second sidelink UE over the second Rx beam. The Rx beam schedule may define a set of slots (or mini-slots) per periodicity (e.g., T seconds) that the first sidelink UE will tune to corresponding Rx beam(s). The first sidelink UE may receive the transmission from the second sidelink UE via the first Rx beam based at least in part on the Rx beam schedule. The Rx beam schedule may be committed or conditionally committed with respect to certain receiving beam(s) in a periodicity T. When conditionally committed, the first sidelink UE may be available based at least in part on a dynamic signaling exchange, which may involve receiving a request in a preceding committed slot. The Rx beam schedule may be used for unicast establishment and maintenance, and may be associated with semi-static configurations. In other words, the Rx beam schedule may be used by the second sidelink UE and the first sidelink UE in a semi-static manner.

As indicated above, FIG. 3 is provided as an example. Other examples may differ from what is described with regard to FIG. 3.

In a past approach, Rx beam schedules were used for unicast establishment and maintenance. The Rx beam schedules were used by a pair of sidelink UEs in a semi-static manner. However, the past approach required a unicast connection between the pair of sidelink UEs, thereby limiting sidelink UEs that were able to use the Rx beam schedules to only those sidelink UEs having unicast connections.

In various aspects of techniques and apparatuses described herein, a first sidelink UE may transmit, to a second sidelink UE via SCI, an Rx beam schedule indicating Rx beams associated with the first sidelink UE in a set of slots. The Rx beam schedule may indicate that the first sidelink UE is configured to tune to the Rx beams in the set of slots for possible sidelink receptions. The first sidelink UE may receive, from the second sidelink UE, a sidelink transmission using an Rx beam indicated in the Rx beam schedule, which may be irrespective of a unicast connection setup between the first sidelink UE and the second sidelink UE. The first sidelink UE may receive the sidelink transmission without the unicast connection setup between the first sidelink UE and the second sidelink UE, or prior to the unicast connection setup between the first sidelink UE and the second sidelink UE. As a result, any UE that is able to receive the Rx beam schedule via the SCI, such as the second sidelink UE, may be enabled to reliably transmit to the first sidelink UE over specified Rx beams indicated in the Rx beam schedule. Any UE that is able to receive the Rx beam schedule via the SCI may transmit to the first sidelink UE over the specified Rx beams without (or before) a unicast connection setup with the first sidelink UE, thereby reducing signaling associated with the unicast connection setup.

Figure 4:
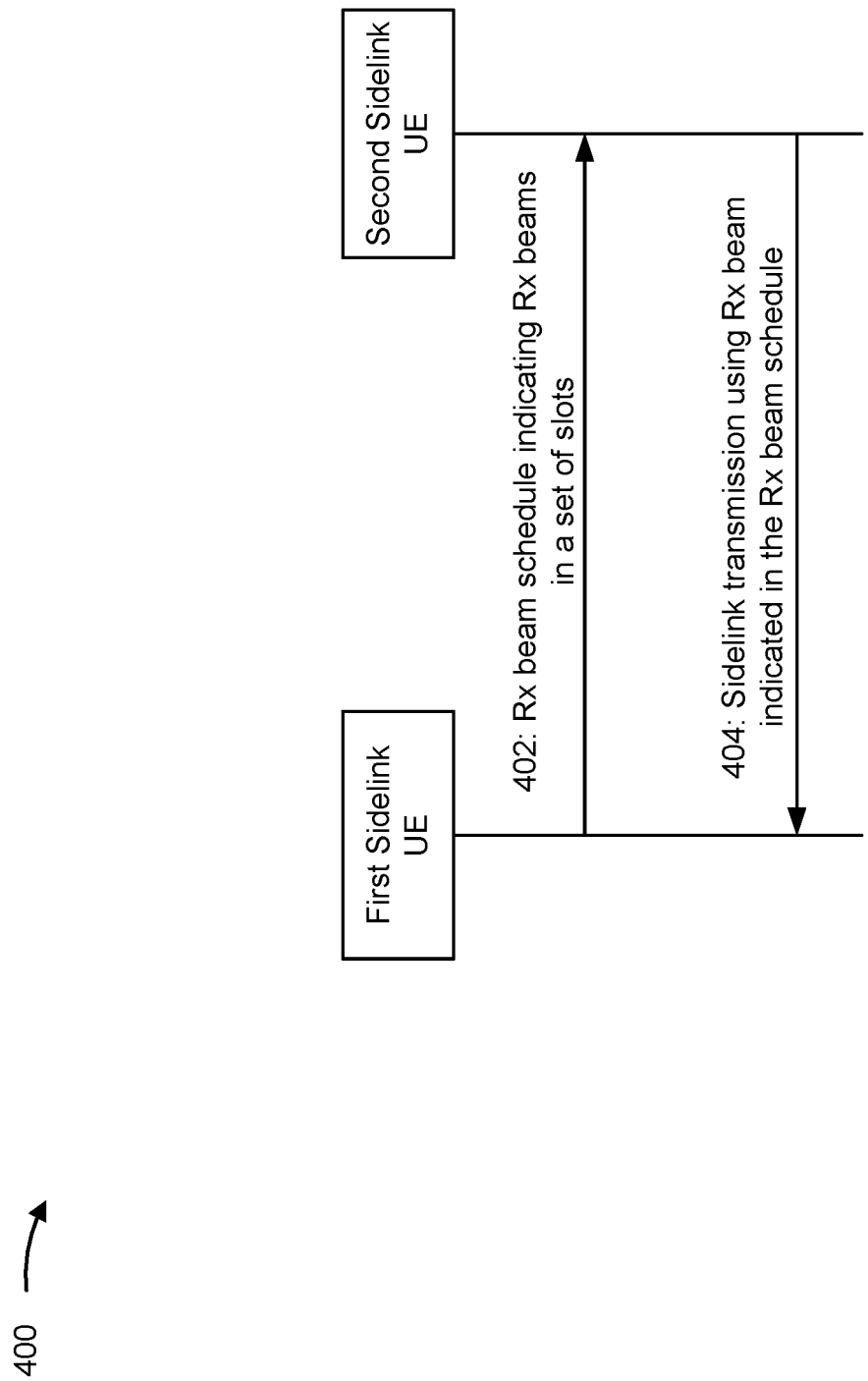

FIG. 4 is a diagram illustrating an example 400 associated with transmitting an Rx beam schedule, in accordance with the present disclosure. As shown in FIG. 4, example 400 includes communication between a first sidelink UE (e.g., UE 120a) and a second sidelink UE (e.g., UE 120e). In some aspects, the first sidelink UE and the second sidelink UE may be included in a wireless network, such as wireless network 100.

As shown by reference number 402, the first UE may transmit, to the second sidelink UE via SCI, an Rx beam schedule indicating Rx beams associated with the first sidelink UE in a set of slots. The Rx beam schedule may indicate that the first sidelink UE is configured to tune to the Rx beams in the set of slots for possible sidelink receptions.

In some aspects, the first sidelink UE may transmit the Rx beam schedule in a unicast PSCCH or PSSCH. In some aspects, the first sidelink UE may transmit the Rx beam schedule in a groupcast PSCCH or PSSCH (or a multicast PSCCH or PSSCH). In some aspects, the first sidelink UE may transmit the Rx beam schedule in a broadcast PSCCH or PSSCH. In some aspects, the first sidelink UE may transmit the Rx beam schedule in a medium access control control element (MAC-CE). In some aspects, the first sidelink UE may transmit the Rx beam schedule in an application layer packet in the groupcast PSCCH or PSSCH, or in the broadcast PSCCH or PSSCH.

In some aspects, the Rx beam indicated in the Rx beam schedule may correspond to a Tx beam used for transmitting a current PSCCH or PSSCH. In some aspects, the Rx beam schedule may indicate other Rx beams not corresponding to the Tx beam. In some aspects, the Rx beam schedule may be a dynamic Rx beam schedule that indicates the set of slots in a time window. The dynamic Rx beam schedule may be carried in the SCI based at least in part on repurposing a dynamic reservation field in a PSCCH.

In some aspects, the Rx beam schedule may be a periodic Rx beam schedule that indicates that the first sidelink UE is configured to tune to the Rx beams in the set of slots defined with a periodicity in a time window. The periodic Rx beam schedule may be carried in the SCI based at least in part on repurposing a periodic reservation field in the PSCCH. In some aspects, the periodic Rx beam schedule may indicate that the first sidelink UE is configured to perform a beam sweeping reception at a start of the set of slots defined with a periodicity in a time window. In some aspects, the periodic Rx beam schedule may indicate a start of a next periodic Rx beam schedule, where the start of the next periodic Rx beam schedule may correspond to a time window of upcoming slots during which the first sidelink UE transmits the next periodic Rx beam schedule.

In some aspects, the first sidelink UE may receive the Rx beam schedule from a base station. The first sidelink UE may transmit, to the second sidelink UE, the Rx beam schedule received from the base station. In some aspects, the first sidelink UE may receive an initial Rx beam schedule from the base station. The first sidelink UE may transmit, to the second sidelink UE, the Rx beam schedule based at least in part on the initial Rx beam schedule received from the base station.

As shown by reference number 404, the first sidelink UE may receive, from the second sidelink UE, a sidelink transmission using an Rx beam indicated in the Rx beam schedule, which may be irrespective of a unicast connection setup between the first sidelink UE and the second sidelink UE. The first sidelink UE may receive the sidelink transmission without the unicast connection setup between the first sidelink UE and the second sidelink UE, or prior to the unicast connection setup between the first sidelink UE and the second sidelink UE.

In some aspects, the second sidelink UE may receive, from the first sidelink UE via the SCI, the Rx beam schedule indicating Rx beams associated with the first sidelink UE in a set of slots. The second sidelink UE may transmit, to the first sidelink UE, the sidelink transmission using the Rx beam indicated in the Rx beam schedule irrespective of the unicast connection setup between the second sidelink UE and the first sidelink UE.

As indicated above, FIG. 4 is provided as an example. Other examples may differ from what is described with regard to FIG. 4.

FIG. 5 is a diagram illustrating an example 500 associated with transmitting an Rx beam schedule, in accordance with the present disclosure.

In some aspects, when a first sidelink UE (UE 1) is performing a beam-based transmission/reception (e.g., an analog-beam-based transmission/reception), the first sidelink UE may carry an Rx beam schedule in SCI. The SCI may be carried in a PSCCH/PSSCH. The Rx beam schedule may be associated with specific Rx beam(s) of the first sidelink UE in upcoming slots, such that a second sidelink UE (UE 2) (or any other UE) that receives the SCI may be enabled to reliably transmit to the first sidelink UE over the specified Rx beam(s). The first sidelink UE may broadcast the Rx beam schedule, which may be received by any other UE, such as the second sidelink UE, that is capable of receiving a broadcast of the Rx beam schedule. The Rx beam(s) indicated in the Rx beam schedule may be associated with the first sidelink UE and may allow the first sidelink UE to receive transmissions from the second sidelink UE. The Rx beam schedule may indicate the Rx beam(s) associated with a certain slot or periodicity (T). The second sidelink UE that receives the SCI may transmit to the first sidelink UE over the specified Rx beam(s) without a unicast connection setup with the first sidelink UE (or before a unicast connection setup with the first sidelink UE). The SCI may include dynamic Rx beam schedule(s), which enable transmissions between sidelink UEs without a unicast connection between the sidelink UEs.

In some aspects, the Rx beam schedule may indicate an Rx beam corresponding to a Tx beam used by a current PSCCH/PSSCH. The Rx beam schedule may be a dynamic, one-shot schedule that explicitly indicates a set of slots within an upcoming 32-slot duration. The Rx beam schedule may be periodic (e.g., a same Rx beam may be used with an indicated periodicity). The Rx beam schedule may indicate other Rx beams not necessarily corresponding to a current Tx beam. In some aspects, when the first sidelink UE is operating in a Mode 1, the Rx beam schedule may be determined by the base station and indicated to the first sidelink UE.

In some aspects, the Rx beam schedule of an Rx beam may indicate a set of slots (or mini-slots) that the first sidelink UE will perform reception(s) on using the Rx beam. The Rx beam schedule may be carried in SCI in unicast, groupcast, or a broadcast PSCCH/PSSCH. The second sidelink UE that receives the Rx beam schedule may perform blind SCI decoding, irrespective of a cast type. The Rx beam schedule may be carried in a MAC-CE or application layer packet in a groupcast/broadcast PSCCH/PSSCH.

In some aspects, the second sidelink UE may receive Rx beam schedules from a plurality of different sidelink UEs. The second sidelink UE may be triggered to transmit a MAC-CE report associated with all of the Rx beam schedules received from the plurality of different sidelink UEs. The second sidelink UE may transmit the MAC-CE report indicating all of the Rx beam schedules in order to arrange a multi-hop/multi-connection. In some aspects, the trigger may be from a peer sidelink UE that has a unicast connection with the second sidelink UE. In some aspects, the trigger may be from the base station when the second sidelink UE is operating in the Mode 1. In some aspects, the trigger may be based at least in part on a periodic timer. The trigger may specify a time interval for filtering out a set of valid Rx beam schedules.

As indicated above, FIG. 5 is provided as an example. Other examples may differ from what is described with regard to FIG. 5.

FIG. 6 is a diagram illustrating an example 600 associated with transmitting an Rx beam schedule that indicates a default beam index and an additional beam index, in accordance with the present disclosure.

A first sidelink UE (UE 1) may transmit the Rx beam schedule in SCI to a second sidelink UE (UE 2), where the SCI may be carried in a PSCCH/PSSCH. The Rx beam schedule may be for Rx beam(s) corresponding to Tx beam(s) transmitting a current PSCCH and PSSCH (e.g., assuming a beam correspondence). When the current PSCCH and PSCCH are transmitted over different beams, a layer 3 configuration may indicate a specific beam correspondence (e.g., the Rx beam schedule may be with respect to a Tx beam of the PSSCH). The Rx beam schedule may override the layer 3 configuration (e.g., by using the Tx beam of the PSCCH). Additional bits may be available for beam indices, such that the Rx beam schedule may indicate additional beam indices associated with additional Rx beam (s). In other words, the Rx beam schedule may indicate beam indices of Rx beams that do not necessarily correspond to the Tx beams. Further, the SCI may carry a Tx beam index, which may enable other UEs to transmit toward a specified beam.

As indicated above, FIG. 6 is provided as an example. Other examples may differ from what is described with regard to FIG. 6.

Figure 7:
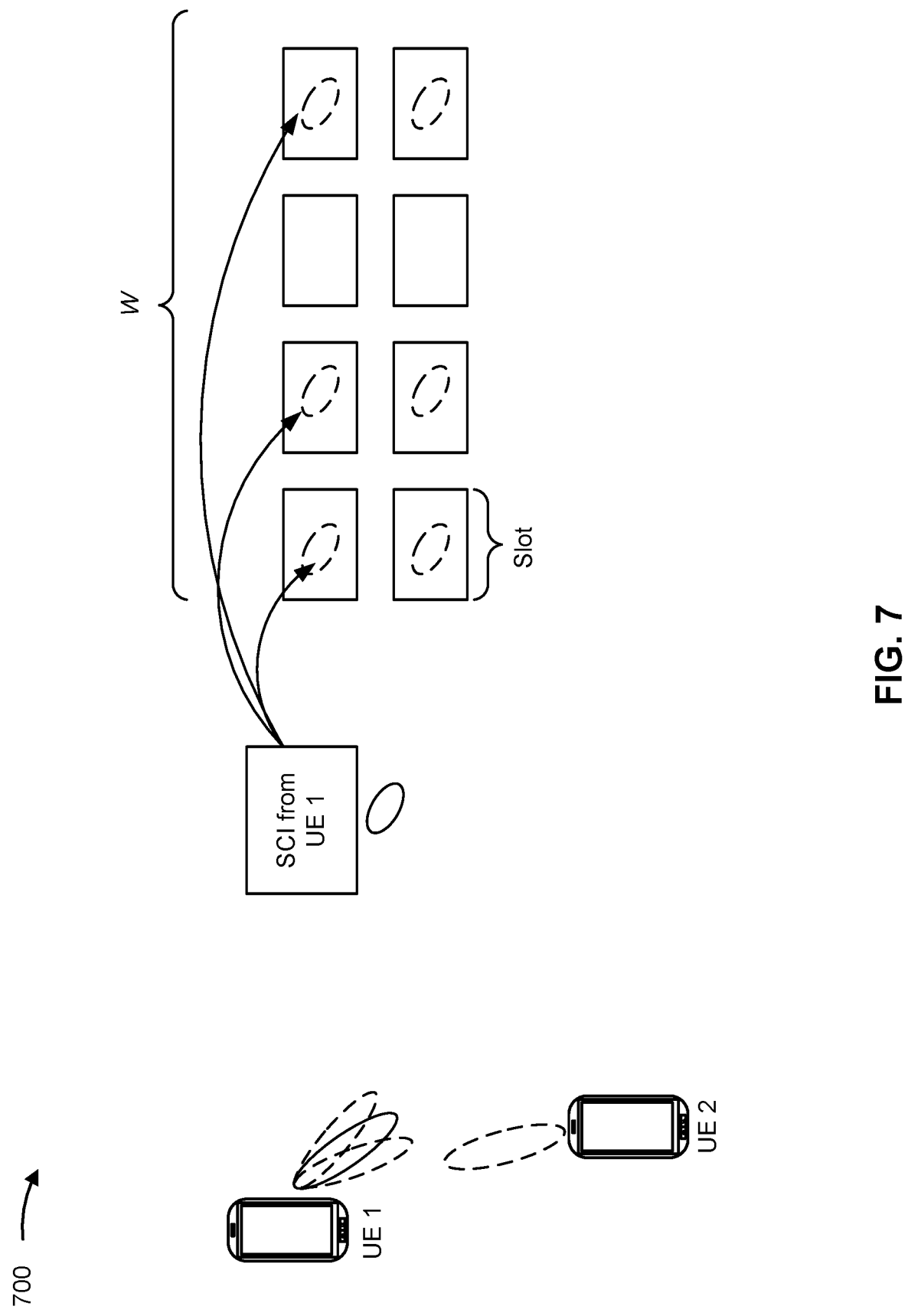
FIG. 7 is a diagram illustrating an example associated with transmitting a dynamic Rx beam schedule, in accordance with the present disclosure.

FIG. 7 is a diagram illustrating an example 700 associated with transmitting a dynamic Rx beam schedule, in accordance with the present disclosure.

A first sidelink UE (UE 1) may transmit the dynamic Rx beam schedule in SCI to a second sidelink UE (UE 2), where the SCI may be carried in a PSCCH/PSSCH. The dynamic Rx beam schedule may indicate a set of slots (or mini-slots) that the first sidelink UE will tune to indicated beam(s) in a window W (e.g., 32 slots/mini-slots), where the window W may be configured via layer 3 signaling. The dynamic Rx beam schedule may include one or two slots/mini-slots and may utilize encoding associated with a time-domain reservation. For example, five bits may be used to reserve one slot, or nine bits may be used to reserve two slots, in a 32-slot window. When more than two slots/mini-slots are to be included, the dynamic Rx beam schedule can use a combination index associated with an uplink resource allocation Type 1. Specifically, to indicate k slots $0 \leq t_1 < t_2 < \ldots < t_k < W$, the SCI may carry a redundancy version (RV) that follows $$\sum_{j=1}^{k} \binom{t_j}{j}.$$

In some aspects, the dynamic Rx beam schedule may be carried by repurposing a legacy dynamic reservation field in a PSCCH. The first sidelink UE may carry one additional bit (or two additional bits) in SCI to indicate that a time-domain Tx reservation (or a portion of the time-domain Tx reservation) is repurposed for receiving the dynamic Rx beam schedule. When a sidelink maximum number per reservation (sl-MaxNumPerReserve) parameter is equal to two, a re-purposed field may carry a one-slot (or mini-slot) dynamic Rx beam schedule. When the sl-MaxNumPerReserve parameter is equal to three, the re-purposed field may carry a one-slot (or mini-slot) dynamic Rx beam schedule and a one-slot (or mini-slot) Tx reservation (e.g., two bits), or a two-slot (or mini-slot) dynamic Rx beam schedule. A corresponding frequency-domain TX reservation may be re-purposed to accommodate a dynamic Rx beam schedule including a set with three or more slots (or mini-slots).

As indicated above, FIG. 7 is provided as an example. Other examples may differ from what is described with regard to FIG. 7.

FIG. 8 is a diagram illustrating an example 800 associated with transmitting a periodic Rx beam schedule, in accordance with the present disclosure.

A first sidelink UE (UE 1) may transmit the periodic Rx beam schedule in SCI to a second sidelink UE (UE 2), where the SCI may be carried in a PSCCH/PSSCH. The periodic Rx beam schedule may indicate that the first sidelink UE will tune indicated Rx beam(s) associated with the first sidelink UE in a set of slots defined with a periodicity of T in a window W' (e.g., a defined duration of slots/mini-slots), where the window W' may be configured via layer 3 signaling. Further, the layer 3 signaling may preconfigure an offset O (or a set of offsets to be dynamically selected by the periodic Rx beam schedule) from a current slot, where the offset may be needed when a periodic Tx reservation is declared simultaneously with a periodic reception.

In some aspects, the periodic Rx beam schedule may be carried by repurposing a periodic reservation field in a PSCCH. For example, in a legacy system, a resource reservation period $-\lceil \log_2 N_{rsv\_period} \rceil$ bits may be carried in an SCI-1, where the $N_{rsv\_period}$ indicates a quantity of entries in a sidelink resource reservation period list (sl-ResourceReservePeriodList) higher layer parameter, when a sidelink multi reservation resource (sl-MultiReserveResource) is configured. The first sidelink UE may carry one bit in SCI to indicate that this field has been repurposed for indicating the periodic Rx beam schedule. In this case, the offset O may be equal to zero.

As indicated above, FIG. 8 is provided as an example. Other examples may differ from what is described with regard to FIG. 8.

FIG. 9 is a diagram illustrating an example 900 associated with transmitting a periodic Rx beam schedule that indicates beam sweeping, in accordance with the present disclosure.

A first sidelink UE (UE 1) may transmit the periodic Rx beam schedule in SCI to a second sidelink UE (UE 2), where the SCI may be carried in a PSCCH/PSSCH. The periodic Rx beam schedule may indicate that the first sidelink UE will perform a beam sweeping reception (for a duration 5) starting at each periodic instance (associated with a duration of T), where S may be a pre-configured value configured via layer 3 signaling.

As indicated above, FIG. 9 is provided as an example. Other examples may differ from what is described with regard to FIG. 9.

FIG. 10 is a diagram illustrating an example 1000 associated with transmitting a periodic Rx beam schedule that indicates an availability of a next periodic Rx beam schedule, in accordance with the present disclosure.

A first sidelink UE (UE 1) may transmit the periodic Rx beam schedule in SCI to a second sidelink UE (UE 2), where the SCI may be carried in a PSCCH/PSSCH. The periodic Rx beam schedule may include an indication that indicates the availability of the next periodic Rx beam schedule, for example, when a finite window W' is configured via layer 3 signaling. The indication may indicate a time window of Z upcoming slots (or mini-slots) in which the first sidelink UE may transmit an updated periodic Rx beam schedule. A duration between a current slot and a start of the Z upcoming slots may be defined by Y slots (or mini-slots).

As indicated above, FIG. 10 is provided as an example. Other examples may differ from what is described with regard to FIG. 10.

Figure 11:
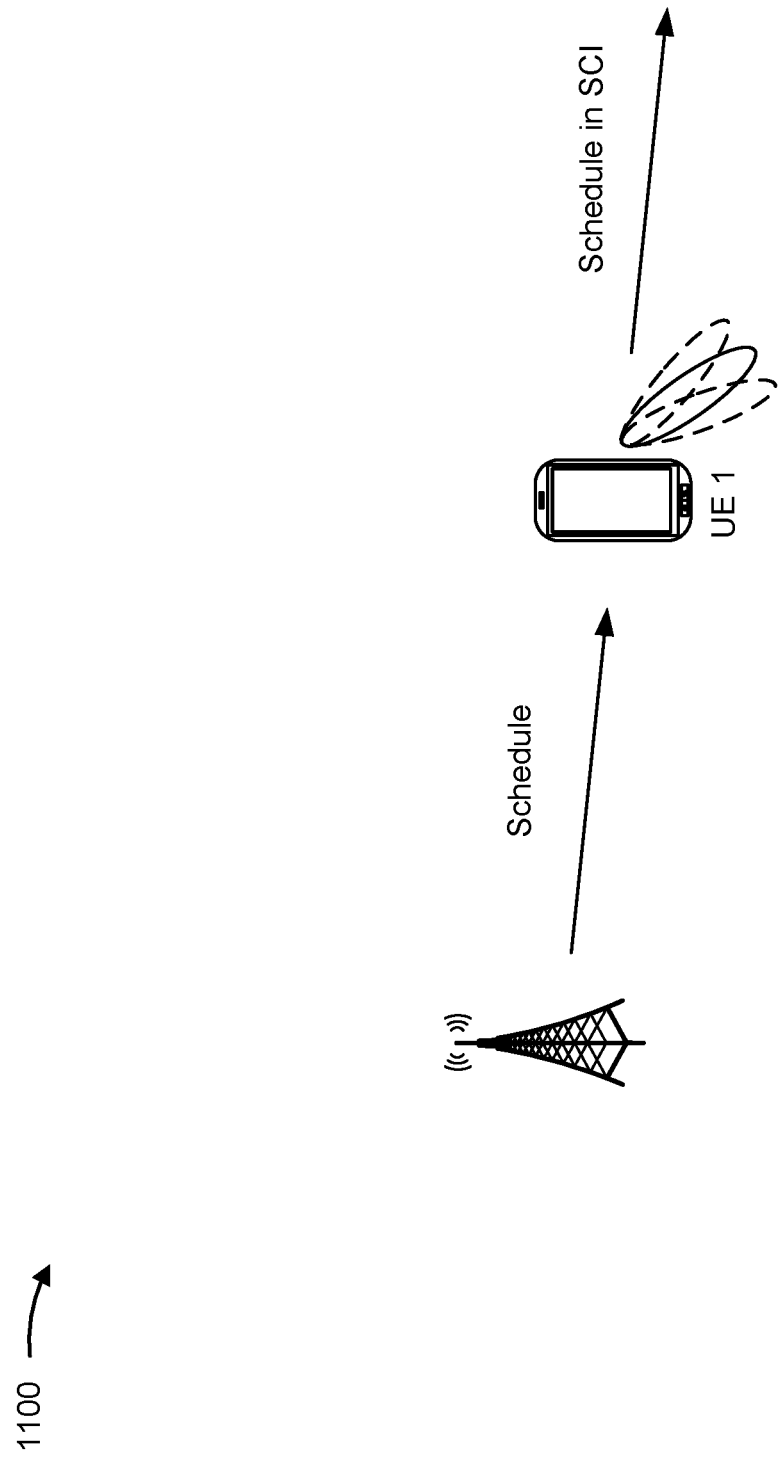
FIG. 11 is a diagram illustrating an example associated with receiving an Rx beam schedule from a base station, in accordance with the present disclosure.

FIG. 11 is a diagram illustrating an example 1100 associated with receiving an Rx beam schedule from a base station, in accordance with the present disclosure.

A first sidelink UE (UE 1) operating in a Mode 1 may receive the Rx beam schedule from the base station. For example, the first sidelink UE may receive a dynamic Rx beam schedule from the base station in downlink control information (DCI), together with a grant for a PSCCH/PSSCH transmission. As another example, the first sidelink UE may receive a periodic Rx beam schedule from the base station in a MAC-CE. In some aspects, the first sidelink UE may receive the Rx beam schedule from the base station, and the first sidelink UE may transmit the Rx beam schedule in SCI to other sidelink UEs. Alternatively, the first sidelink UE may receive the Rx beam schedule from the base station, and the first sidelink UE may transmit, in SCI, an extended Rx beam schedule. The extended Rx beam schedule may include the Rx beam schedule indicated by the base station as a subset. In some aspects, the base station may preconfigure the first sidelink UE with a set of slots (or mini-slots), which the first sidelink UE may use for receiving the Rx beam schedule.

As indicated above, FIG. 11 is provided as an example. Other examples may differ from what is described with regard to FIG. 11.

Figure 12:
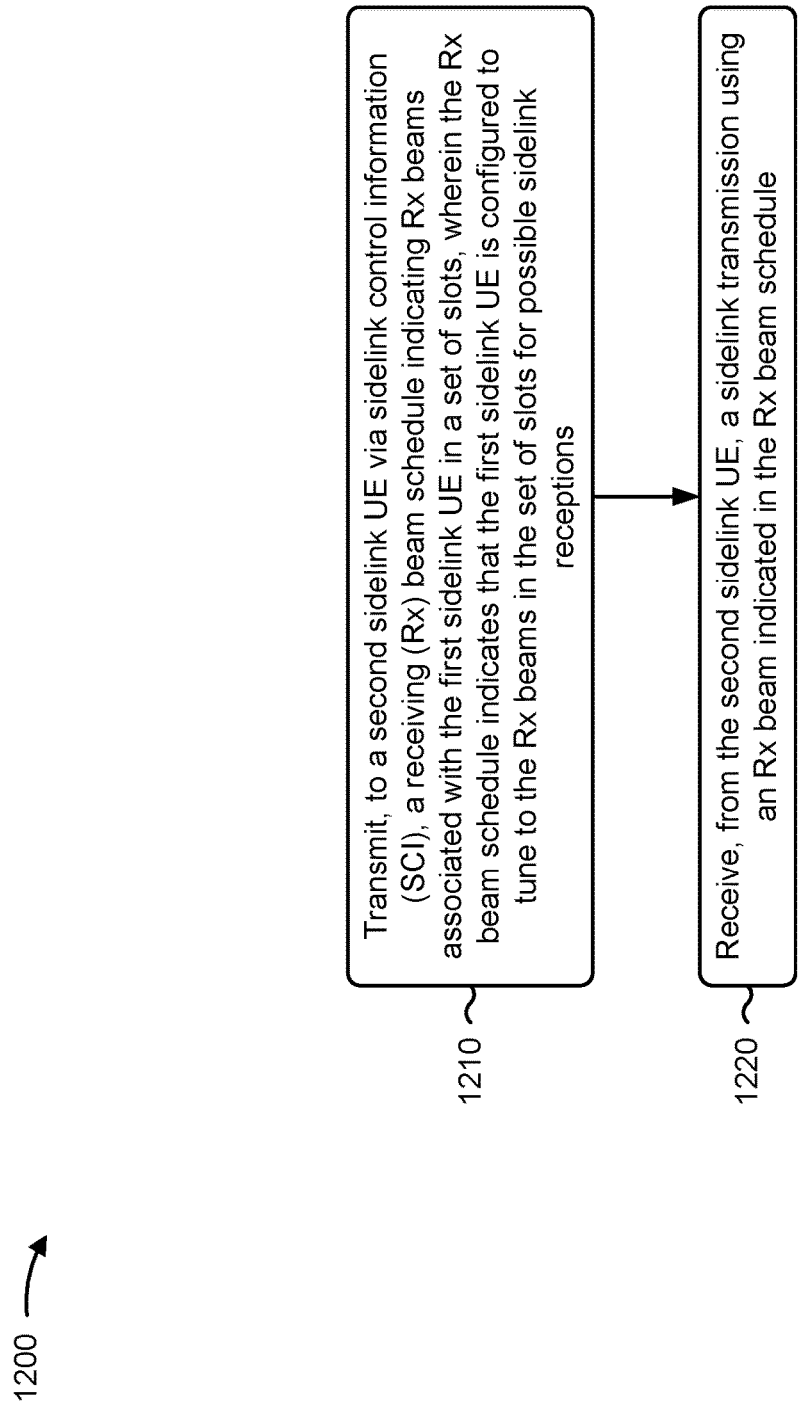
FIGS. 12-13 are diagrams illustrating example processes associated with transmitting Rx beam schedules to sidelink UEs, in accordance with the present disclosure.

FIG. 12 is a diagram illustrating an example process 1200 performed, for example, by a first sidelink UE, in accordance with the present disclosure. Example process 1200 is an example where the first sidelink UE (e.g., UE 120a) performs operations associated with transmitting Rx beam schedules to sidelink UEs.

As shown in FIG. 12, in some aspects, process 1200 may include transmitting, to a second sidelink UE via SCI, an Rx beam schedule indicating Rx beams associated with the first sidelink UE in a set of slots, wherein the Rx beam schedule indicates that the first sidelink UE is configured to tune to the Rx beams in the set of slots for possible sidelink receptions (block 1210). For example, the first sidelink UE (e.g., using transmission component 1404, depicted in FIG. 14) may transmit, to a second sidelink UE via SCI, an Rx beam schedule indicating Rx beams associated with the first sidelink UE in a set of slots, wherein the Rx beam schedule indicates that the first sidelink UE is configured to tune to the Rx beams in the set of slots for possible sidelink receptions, as described above.

As further shown in FIG. 12, in some aspects, process 1200 may include receiving, from the second sidelink UE, a sidelink transmission using an Rx beam indicated in the Rx beam schedule (block 1220). For example, the first sidelink UE (e.g., using reception component 1402, depicted in FIG. 14) may receive, from the second sidelink UE, a sidelink transmission using an Rx beam indicated in the Rx beam schedule, as described above.

Process 1200 may include additional aspects, such as any single aspect or any combination of aspects described below and/or in connection with one or more other processes described elsewhere herein.

In a first aspect, process 1200 includes receiving the sidelink transmission without the unicast connection setup between the first sidelink UE and the second sidelink UE, or prior to the unicast connection setup between the first sidelink UE and the second sidelink UE.

In a second aspect, alone or in combination with the first aspect, process 1200 includes transmitting the Rx beam schedule in a unicast PSCCH or PSSCH, transmitting the Rx beam schedule in a groupcast PSCCH or PSSCH, transmitting the Rx beam schedule in a broadcast PSCCH or PSSCH, transmitting the Rx beam schedule in a MAC-CE, or transmitting the Rx beam schedule in an application layer packet in the groupcast PSCCH or PSSCH, or in the broadcast PSCCH or PSSCH.

In a third aspect, alone or in combination with one or more of the first and second aspects, the Rx beam indicated in the Rx beam schedule corresponds to a Tx beam used for transmitting a current PSCCH or PSSCH, or the Rx beam schedule indicates other Rx beams not corresponding to the Tx beam.

In a fourth aspect, alone or in combination with one or more of the first through third aspects, the Rx beam schedule is a dynamic Rx beam schedule that indicates the set of slots in a time window, and the dynamic Rx beam schedule is carried in the SCI based at least in part on repurposing a dynamic reservation field in a physical sidelink control channel.

In a fifth aspect, alone or in combination with one or more of the first through fourth aspects, the Rx beam schedule is a periodic Rx beam schedule that indicates that the first sidelink UE is configured to tune to the Rx beams in the set of slots defined with a periodicity in a time window, and the periodic Rx beam schedule is carried in the SCI based at least in part on repurposing a periodic reservation field in a PSCCH.

In a sixth aspect, alone or in combination with one or more of the first through fifth aspects, the Rx beam schedule is a periodic Rx beam schedule that indicates that the first sidelink UE is configured to perform a beam sweeping reception at a start of the set of slots defined with a periodicity in a time window.

In a seventh aspect, alone or in combination with one or more of the first through sixth aspects, the Rx beam schedule is a periodic Rx beam schedule that indicates a start of a next periodic Rx beam schedule, and the start of the next periodic Rx beam schedule corresponds to a time window of upcoming slots during which the first sidelink UE transmits the next periodic Rx beam schedule.

In an eighth aspect, alone or in combination with one or more of the first through seventh aspects, process 1200 includes receiving the Rx beam schedule from a base station, and transmitting the Rx beam schedule received from the base station.

In a ninth aspect, alone or in combination with one or more of the first through eighth aspects, process 1200 includes receiving an initial Rx beam schedule from a base station, and transmitting the Rx beam schedule based at least in part on the initial Rx beam schedule received from the base station.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:

FIG. 13 is a diagram illustrating an example process 1300 performed, for example, by a second sidelink UE, in accordance with the present disclosure. Example process 1300 is an example where the second sidelink UE (e.g., UE 120e) performs operations associated with transmitting Rx beam schedules to sidelink UEs.

As shown in FIG. 13, in some aspects, process 1300 may include receiving, from a first sidelink UE via SCI, an Rx beam schedule indicating Rx beams associated with the first sidelink UE in a set of slots (block 1310). For example, the second sidelink UE (e.g., using reception component 1502, depicted in FIG. 15) may receive, from a first sidelink UE via SCI, an Rx beam schedule indicating Rx beams associated with the first sidelink UE in a set of slots, as described above.

As further shown in FIG. 13, in some aspects, process 1300 may include transmitting, to the first sidelink UE, a sidelink transmission using an Rx beam indicated in the Rx beam schedule (block 1320). For example, the UE (e.g., using transmission component 1504, depicted in FIG. 15) may transmit, to the first sidelink UE, a sidelink transmission using an Rx beam indicated in the Rx beam schedule, as described above.

Process 1300 may include additional aspects, such as any single aspect or any combination of aspects described below and/or in connection with one or more other processes described elsewhere herein.

In a first aspect, process 1300 includes receiving a plurality of Rx beam schedules from a plurality of sidelink UEs, and transmitting, based at least in part on an occurrence of a triggering condition, a MAC-CE associated with the plurality of Rx beam schedules, and the triggering condition is based at least in part on a signal received from a peer sidelink UE having a unicast connection with the second sidelink UE, a signal from a base station, or a periodic timer.

In a second aspect, alone or in combination with the first aspect, process 1300 includes transmitting the sidelink transmission without the unicast connection setup between the second sidelink UE and the first sidelink UE, or prior to the unicast connection setup between the second sidelink UE and the first sidelink UE.

In a third aspect, alone or in combination with one or more of the first and second aspects, the Rx beam schedule is a dynamic Rx beam schedule that indicates the set of slots in a time window, and the dynamic Rx beam schedule is carried in the SCI based at least in part on repurposing a dynamic reservation field in a PSCCH.

In a fourth aspect, alone or in combination with one or more of the first through third aspects, the Rx beam schedule is a periodic Rx beam schedule that indicates the first sidelink UE is configured to tune to the Rx beams in the set of slots defined with a periodicity in a time window, and the periodic Rx beam schedule is carried in the SCI based at least in part on repurposing a periodic reservation field in a PSCCH.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
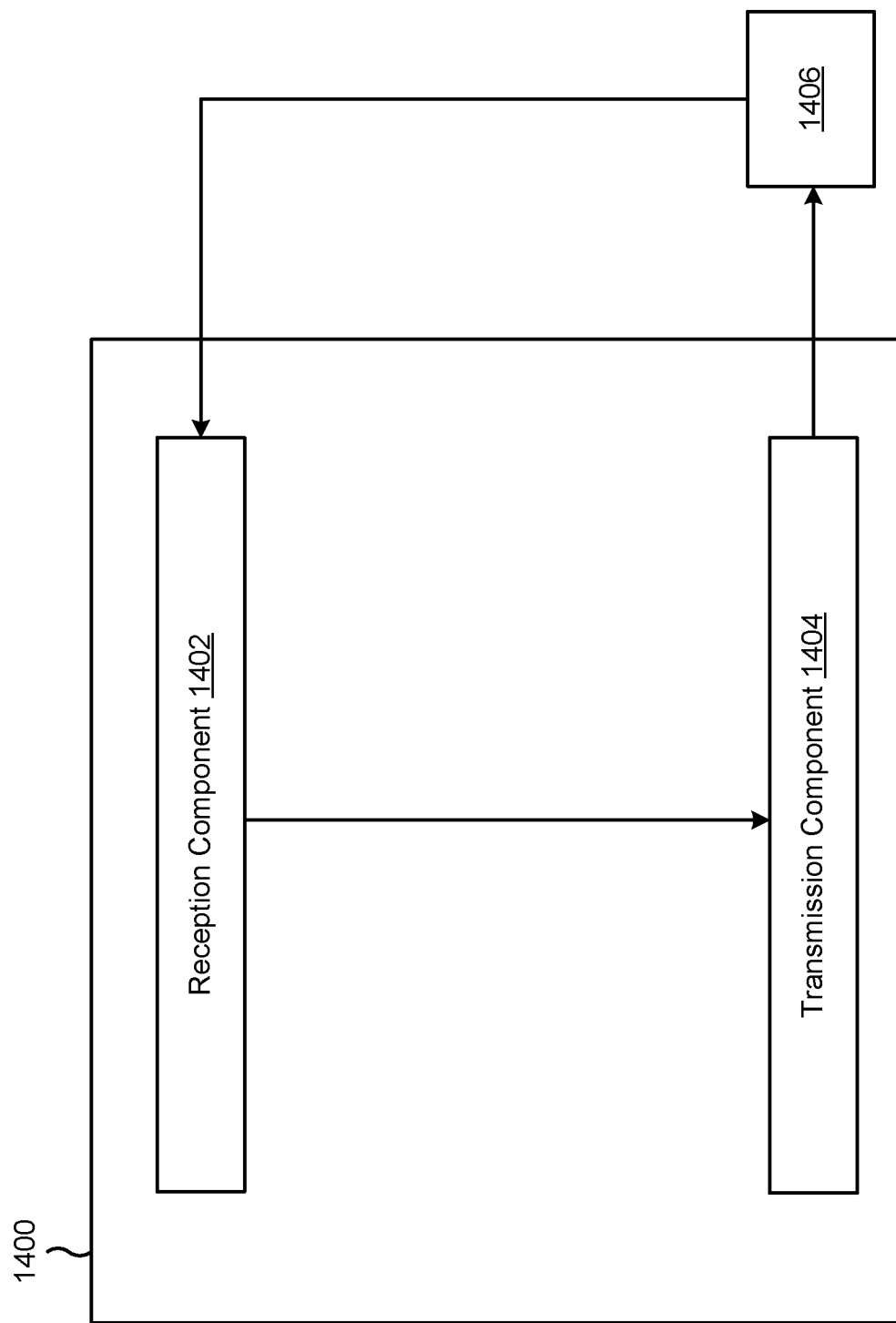
FIGS. 14-15 are diagrams of example apparatuses for wireless communication, in accordance with the present disclosure.

FIG. 14 is a diagram of an example apparatus 1400 for wireless communication. The apparatus 1400 may be a first sidelink UE, or a first sidelink UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 4-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the first sidelink UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a modem, a demodulator, a MIMO detector, a receive processor, a controller/processor, a memory, or a combination thereof, of the first sidelink UE described in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the first sidelink UE described in connection with FIG. 2. In some aspects, the transmission component 1404 may be co-located with the reception component 1402 in a transceiver.

The transmission component 1404 may transmit, to a second sidelink UE via SCI, an Rx beam schedule indicating Rx beams associated with the first sidelink UE in a set of slots, wherein the Rx beam schedule indicates that the first sidelink UE is configured to tune to the Rx beams in the set of slots for possible sidelink receptions. The reception component 1402 may receive, from the second sidelink UE, a sidelink transmission using an Rx beam indicated in the Rx beam schedule.

The reception component 1402 may receive the sidelink transmission without the unicast connection setup between the first sidelink UE and the second sidelink UE, or prior to the unicast connection setup between the first sidelink UE and the second sidelink UE. The transmission component 1404 may transmit the Rx beam schedule in a unicast PSCCH or PSSCH; transmit the Rx beam schedule in a groupcast PSCCH or PSSCH; transmit the Rx beam schedule in a broadcast PSCCH or PSSCH; transmit the Rx beam schedule in a MAC-CE; or transmit the Rx beam schedule in an application layer packet in the groupcast PSCCH or PSSCH, or in the broadcast PSCCH or PSSCH The reception component 1402 may receive the Rx beam schedule from a base station. The transmission component 1404 may transmit, to the second sidelink UE, the Rx beam schedule received from the base station. The reception component 1402 may receive an initial Rx beam schedule from a base station. The transmission component 1404 may transmit, to the second sidelink UE, the Rx beam schedule based at least in part on the initial Rx beam schedule received from the base station The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
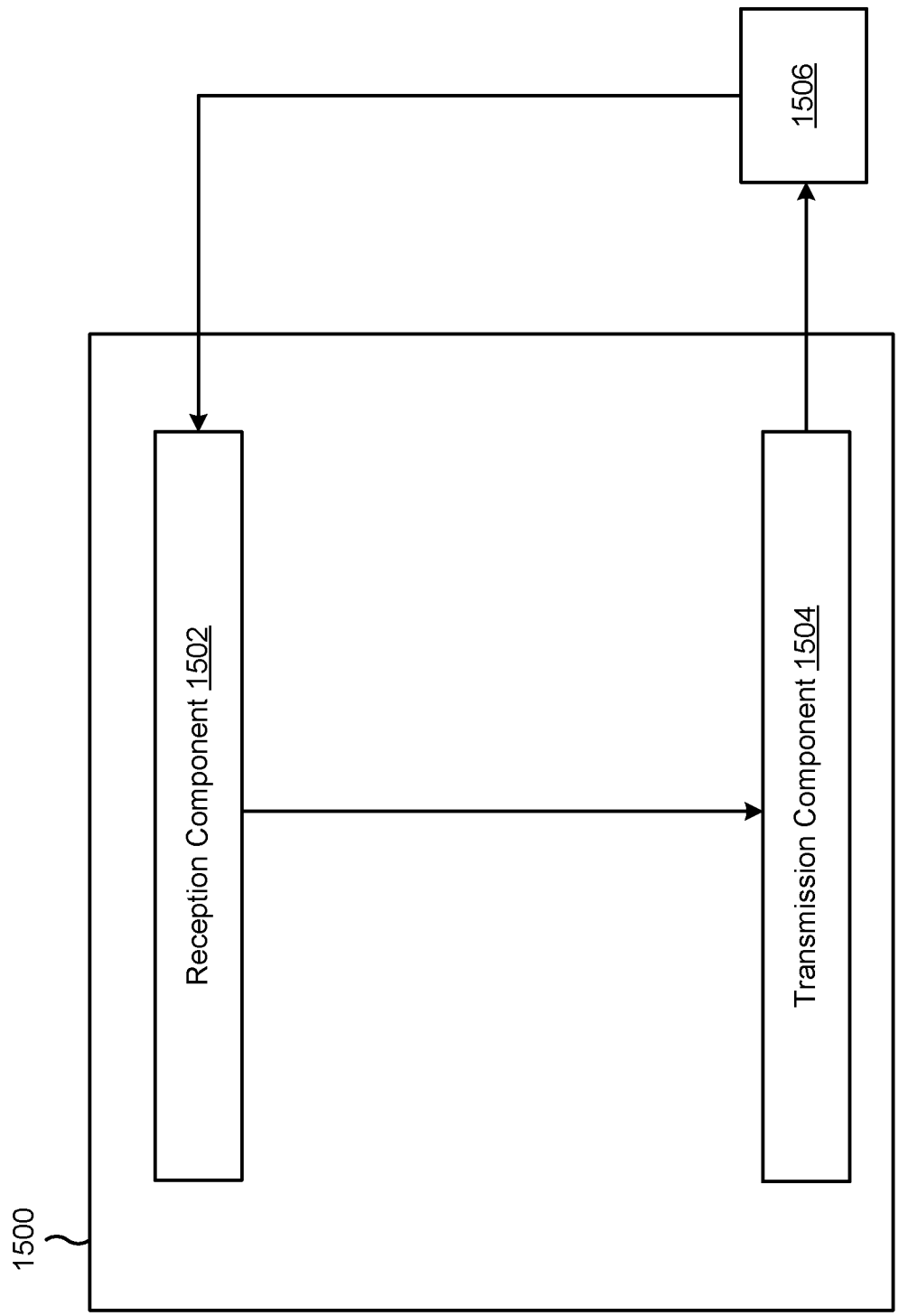

FIG. 15 is a diagram of an example apparatus 1500 for wireless communication. The apparatus 1500 may be a second sidelink UE, or a second sidelink UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504.

In some aspects, the apparatus 1500 may be configured to perform one or more operations described herein in connection with FIGS. 4-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the second sidelink UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a modem, a demodulator, a MIMO detector, a receive processor, a controller/processor, a memory, or a combination thereof, of the second sidelink UE described in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the second sidelink UE described in connection with FIG. 2. In some aspects, the transmission component 1504 may be co-located with the reception component 1502 in a transceiver.

The reception component 1502 may receive, from a first sidelink UE via SCI, an Rx beam schedule indicating Rx beams associated with the first sidelink UE in a set of slots. The transmission component 1504 may transmit, to the first sidelink UE, a sidelink transmission using an Rx beam indicated in the Rx beam schedule.

The reception component 1502 may receive a plurality of Rx beam schedules from a plurality of sidelink UEs. The transmission component 1504 may transmit, based at least in part on an occurrence of a triggering condition, a MAC-CE associated with the plurality of Rx beam schedules, wherein the triggering condition is based at least in part on: a signal received from a peer sidelink UE having a unicast connection with the second sidelink UE, a signal from a base station, or a periodic timer. The transmission component 1504 may transmit the sidelink transmission without the unicast connection setup between the second sidelink UE and the first sidelink UE, or prior to the unicast connection setup between the second sidelink UE and the first sidelink UE.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a first sidelink user equipment (UE), comprising: transmitting, to a second sidelink UE via sidelink control information (SCI), a receiving (Rx) beam schedule indicating Rx beams associated with the first sidelink UE in a set of slots, wherein the Rx beam schedule indicates that the first sidelink UE is configured to tune to the Rx beams in the set of slots for possible sidelink receptions; and receiving, from the second sidelink UE, a sidelink transmission using an Rx beam indicated in the Rx beam schedule.

Aspect 2: The method of Aspect 1, wherein receiving the sidelink transmission using the Rx beam comprises receiving the sidelink transmission without a unicast connection setup between the first sidelink UE and the second sidelink UE, or prior to the unicast connection setup between the first sidelink UE and the second sidelink UE.

Aspect 3: The method of any of Aspects 1 through 2, wherein transmitting the Rx beam schedule comprises: transmitting the Rx beam schedule in a unicast physical sidelink control channel (PSCCH) or physical sidelink shared channel (PSSCH); transmitting the Rx beam schedule in a groupcast PSCCH or PSSCH; transmitting the Rx beam schedule in a broadcast PSCCH or PSSCH; transmitting the Rx beam schedule in a medium access control control element; or transmitting the Rx beam schedule in an application layer packet in the groupcast PSCCH or PSSCH, or in the broadcast PSCCH or PSSCH.

Aspect 4: The method of any of Aspects 1 through 3, wherein the Rx beam indicated in the Rx beam schedule corresponds to a transmit (Tx) beam used for transmitting a current physical sidelink control channel (PSCCH) or physical sidelink shared channel (PSSCH), or wherein the Rx beam schedule indicates other Rx beams not corresponding to the Tx beam.

Aspect 5: The method of any of Aspects 1 through 4, wherein the Rx beam schedule is a dynamic Rx beam schedule that indicates the set of slots in a time window, wherein the dynamic Rx beam schedule is carried in the SCI based at least in part on repurposing a dynamic reservation field in a physical sidelink control channel.

Aspect 6: The method of any of Aspects 1 through 5, wherein the Rx beam schedule is a periodic Rx beam schedule that indicates the first sidelink UE is configured to tune to the Rx beams in the set of slots defined with a periodicity in a time window, wherein the periodic Rx beam schedule is carried in the SCI based at least in part on repurposing a periodic reservation field in a physical sidelink control channel.

Aspect 7: The method of any of Aspects 1 through 6, wherein the Rx beam schedule is a periodic Rx beam schedule that indicates that the first sidelink UE is configured to perform a beam sweeping reception at a start of the set of slots defined with a periodicity in a time window.

Aspect 8: The method of any of Aspects 1 through 7, wherein the Rx beam schedule is a periodic Rx beam schedule that indicates a start of a next periodic Rx beam schedule, wherein the start of the next periodic Rx beam schedule corresponds to a time window of upcoming slots during which the first sidelink UE transmits the next periodic Rx beam schedule.

Aspect 9: The method of any of Aspects 1 through 8, further comprising: receiving the Rx beam schedule from a base station; and wherein transmitting the Rx beam schedule to the second sidelink UE comprises transmitting the Rx beam schedule received from the base station. wherein transmitting the Rx beam schedule to the second sidelink UE comprises transmitting the Rx beam schedule received from the base station.

Aspect 10: The method of any of Aspects 1 through 9, further comprising: receiving an initial Rx beam schedule from a base station; and wherein transmitting the Rx beam schedule to the second sidelink UE comprises transmitting the Rx beam schedule based at least in part on the initial Rx beam schedule received from the base station. wherein transmitting the Rx beam schedule to the second sidelink UE comprises transmitting the Rx beam schedule based at least in part on the initial Rx beam schedule received from the base station.

Aspect 11: A method of wireless communication performed by a second sidelink user equipment (UE), comprising: receiving, from a first sidelink UE via sidelink control information (SCI), a receiving (Rx) beam schedule indicating Rx beams associated with the first sidelink UE in a set of slots; and transmitting, to the first sidelink UE, a sidelink transmission using an Rx beam indicated in the Rx beam schedule.

Aspect 12: The method of Aspect 11, further comprising: receiving a plurality of Rx beam schedules from a plurality of sidelink UEs; and transmitting, based at least in part on an occurrence of a triggering condition, a medium access control control element associated with the plurality of Rx beam schedules, wherein the triggering condition is based at least in part on: a signal received from a peer sidelink UE having a unicast connection with the second sidelink UE, a signal from a base station, or a periodic timer.

Aspect 13: The method of any of Aspects 11 through 12, wherein transmitting the sidelink transmission using the Rx beam comprises transmitting the sidelink transmission without a unicast connection setup between the second sidelink UE and the first sidelink UE, or prior to the unicast connection setup between the second sidelink UE and the first sidelink UE.

Aspect 14: The method of any of Aspects 11 through 13, wherein the Rx beam schedule is a dynamic Rx beam schedule that indicates the set of slots in a time window, wherein the dynamic Rx beam schedule is carried in the SCI based at least in part on repurposing a dynamic reservation field in a physical sidelink control channel.

Aspect 15: The method of any of Aspects 11 through 14, wherein the Rx beam schedule is a periodic Rx beam schedule that indicates the first sidelink UE is configured to tune to the Rx beams in the set of slots defined with a periodicity in a time window, wherein the periodic Rx beam schedule is carried in the SCI based at least in part on repurposing a periodic reservation field in a physical sidelink control channel.

Aspect 16: An apparatus for wireless communication at a device, comprising a processor; memory coupled with the processor; and instructions stored in the memory and executable by the processor to cause the apparatus to perform the method of one or more of Aspects 1-10.

Aspect 17: A device for wireless communication, comprising a memory and one or more processors coupled to the memory, the one or more processors configured to perform the method of one or more of Aspects 1-10.

Aspect 18: An apparatus for wireless communication, comprising at least one means for performing the method of one or more of Aspects 1-10.

Aspect 19: A non-transitory computer-readable medium storing code for wireless communication, the code comprising instructions executable by a processor to perform the method of one or more of Aspects 1-10.

Aspect 20: A non-transitory computer-readable medium storing a set of instructions for wireless communication, the set of instructions comprising one or more instructions that, when executed by one or more processors of a device, cause the device to perform the method of one or more of Aspects 1-10.

Aspect 21: An apparatus for wireless communication at a device, comprising a processor; memory coupled with the processor; and instructions stored in the memory and executable by the processor to cause the apparatus to perform the method of one or more of Aspects 11-15.

Aspect 22: A device for wireless communication, comprising a memory and one or more processors coupled to the memory, the one or more processors configured to perform the method of one or more of Aspects 11-15.

Aspect 23: An apparatus for wireless communication, comprising at least one means for performing the method of one or more of Aspects 11-15.

Aspect 24: A non-transitory computer-readable medium storing code for wireless communication, the code comprising instructions executable by a processor to perform the method of one or more of Aspects 11-15.

Aspect 25: A non-transitory computer-readable medium storing a set of instructions for wireless communication, the set of instructions comprising one or more instructions that, when executed by one or more processors of a device, cause the device to perform the method of one or more of Aspects 11-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first sidelink user equipment (UE), comprising:
a memory; and
one or more processors, coupled to the memory, configured to:
transmit, to a second sidelink UE via sidelink control information (SCI), a receiving (Rx) beam schedule indicating Rx beams associated with the first sidelink UE in a set of slots,
wherein the Rx beam schedule indicates that the first sidelink UE is configured to tune to the Rx beams in the set of slots for sidelink receptions, and
wherein the Rx beam schedule is:
a dynamic Rx beam schedule carried in the SCI based at least in part on a dynamic reservation field being configured in a physical sidelink control channel (PSCCH), or
a periodic Rx beam schedule carried in the SCI based at least in part on a periodic reservation field being configured in the PSCCH; and
receive, from the second sidelink UE, a sidelink transmission using an Rx beam indicated in the Rx beam schedule.

2. The apparatus of claim 1, wherein the one or more processors, to receive the sidelink transmission using the Rx beam, are configured to receive the sidelink transmission without a unicast connection setup between the first sidelink UE and the second sidelink UE, or prior to the unicast connection setup between the first sidelink UE and the second sidelink UE.

3. The apparatus of claim 1, wherein the one or more processors, to transmit the Rx beam schedule, are configured to:
transmit the Rx beam schedule in a unicast PSCCH or physical sidelink shared channel (PSSCH);
transmit the Rx beam schedule in a groupcast PSCCH or PSSCH;
transmit the Rx beam schedule in a broadcast PSCCH or PSSCH;
transmit the Rx beam schedule in a medium access control control element (MAC-CE); or
transmit the Rx beam schedule in an application layer packet in the groupcast PSCCH or PSSCH, or in the broadcast PSCCH or PSSCH.

4. The apparatus of claim 1, wherein the Rx beam indicated in the Rx beam schedule corresponds to a transmit (Tx) beam used for transmitting a current PSCCH or physical sidelink shared channel (PSSCH), or
wherein the Rx beam schedule indicates other Rx beams not corresponding to the Tx beam.

5. The apparatus of claim 1, wherein the dynamic Rx beam schedule indicates the set of slots in a time window.

6. The apparatus of claim 1, wherein the periodic Rx beam schedule indicates that the first sidelink UE is configured to tune to the Rx beams in the set of slots defined with a periodicity in a time window.

7. The apparatus of claim 1, wherein the periodic Rx beam schedule indicates that the first sidelink UE is configured to perform a beam sweeping reception at a start of the set of slots defined with a periodicity in a time window.

8. The apparatus of claim 1, wherein the periodic Rx beam schedule indicates a start of a next periodic Rx beam schedule, wherein the start of the next periodic Rx beam schedule corresponds to a time window of upcoming slots during which the first sidelink UE transmits the next periodic Rx beam schedule.

9. The apparatus of claim 1, wherein the one or more processors are further configured to:
receive the Rx beam schedule from a network entity; and
wherein transmitting the Rx beam schedule to the second sidelink UE comprises transmitting the Rx beam schedule received from the network entity.

10. The apparatus of claim 1, wherein the one or more processors are further configured to:
receive an initial Rx beam schedule from a network entity; and
wherein transmitting the Rx beam schedule to the second sidelink UE comprises transmitting the Rx beam schedule based at least in part on the initial Rx beam schedule received from the network entity.

11. An apparatus for wireless communication at a second sidelink user equipment (UE), comprising:
a memory; and
one or more processors, coupled to the memory, configured to:
receive, from a first sidelink UE via sidelink control information (SCI), a receiving (Rx) beam schedule indicating Rx beams associated with the first sidelink UE in a set of slots,
wherein the Rx beam schedule is:
a dynamic Rx beam schedule carried in the SCI based at least in part on a dynamic reservation field being configured in a physical sidelink control channel (PSCCH), or
a periodic Rx beam schedule carried in the SCI based at least in part on a periodic reservation field being configured in the PSCCH; and
transmit, to the first sidelink UE, a sidelink transmission using an Rx beam indicated in the Rx beam schedule.

12. The apparatus of claim 11, wherein the one or more processors are further configured to:
receive a plurality of Rx beam schedules from a plurality of sidelink UEs; and
transmit, based at least in part on an occurrence of a triggering condition, a medium access control control element (MAC-CE) associated with the plurality of Rx beam schedules,
wherein the triggering condition is based at least in part on:
a signal received from a peer sidelink UE having a unicast connection with the second sidelink UE,
a signal from a network entity, or
a periodic timer.

13. The apparatus of claim 11, wherein the one or more processors, to transmit the sidelink transmission using the Rx beam, are configured to transmit the sidelink transmission without a unicast connection setup between the second sidelink UE and the first sidelink UE, or prior to the unicast connection setup between the second sidelink UE and the first sidelink UE.

14. The apparatus of claim 11, wherein the dynamic Rx beam schedule indicates the set of slots in a time window.

15. The apparatus of claim 11, wherein the periodic Rx beam schedule indicates that the first sidelink UE is configured to tune to the Rx beams in the set of slots defined with a periodicity in a time window.

16. A method of wireless communication performed by a first sidelink user equipment (UE), comprising:
transmitting, to a second sidelink UE via sidelink control information (SCI), a receiving (Rx) beam schedule indicating Rx beams associated with the first sidelink UE in a set of slots,
wherein the Rx beam schedule indicates that the first sidelink UE is configured to tune to the Rx beams in the set of slots for sidelink receptions, and
wherein the Rx beam schedule is:
a dynamic Rx beam schedule carried in the SCI based at least in part on a dynamic reservation field being configured in a physical sidelink control channel (PSCCH), or
a periodic Rx beam schedule carried in the SCI based at least in part on a periodic reservation field being configured in the PSCCH; and
receiving, from the second sidelink UE, a sidelink transmission using an Rx beam indicated in the Rx beam schedule.

17. The method of claim 16, wherein receiving the sidelink transmission using the Rx beam comprises receiving the sidelink transmission without a unicast connection setup between the first sidelink UE and the second sidelink UE, or prior to the unicast connection setup between the first sidelink UE and the second sidelink UE.

18. The method of claim 16, wherein transmitting the Rx beam schedule comprises:
transmitting the Rx beam schedule in a unicast PSCCH or physical sidelink shared channel (PSSCH);
transmitting the Rx beam schedule in a groupcast PSCCH or PSSCH;
transmitting the Rx beam schedule in a broadcast PSCCH or PSSCH;

transmitting the Rx beam schedule in a medium access control control element (MAC-CE); or transmitting the Rx beam schedule in an application layer packet in the groupcast PSCCH or PSSCH, or in the broadcast PSCCH or PSSCH.

19. The method of claim 16, wherein the Rx beam indicated in the Rx beam schedule corresponds to a transmit (Tx) beam used for transmitting a current PSCCH or physical sidelink shared channel (PSSCH), or wherein the Rx beam schedule indicates other Rx beams not corresponding to the Tx beam.

20. The method of claim 16, wherein the dynamic Rx beam schedule indicates the set of slots in a time window.

21. The method of claim 16, wherein the periodic Rx beam schedule indicates the first sidelink UE is configured to tune to the Rx beams in the set of slots defined with a periodicity in a time window.

22. The method of claim 16, wherein the periodic Rx beam schedule indicates that the first sidelink UE is configured to perform a beam sweeping reception at a start of the set of slots defined with a periodicity in a time window.

23. The method of claim 16, wherein the periodic Rx beam schedule indicates a start of a next periodic Rx beam schedule.

24. The method of claim 16, further comprising:
receiving the Rx beam schedule from a network entity; and wherein transmitting the Rx beam schedule to the second sidelink UE comprises transmitting the Rx beam schedule received from the network entity.

25. The method of claim 16, further comprising:
receiving an initial Rx beam schedule from a network entity; and wherein transmitting the Rx beam schedule to the second sidelink UE comprises transmitting the Rx beam schedule based at least in part on the initial Rx beam schedule received from the network entity.

26. A method of wireless communication performed by a second sidelink user equipment (UE), comprising:

receiving, from a first sidelink UE via sidelink control information (SCI), a receiving (Rx) beam schedule indicating Rx beams associated with the first sidelink UE in a set of slots,
wherein the Rx beam schedule is:
a dynamic Rx beam schedule carried in the SCI based at least in part on a dynamic reservation field being configured in a physical sidelink control channel (PSCCH), or
a periodic Rx beam schedule carried in the SCI based at least in part on a periodic reservation field being configured in the PSCCH; and transmitting, to the first sidelink UE, a sidelink transmission using an Rx beam indicated in the Rx beam schedule.

27. The method of claim 26, further comprising:
receiving a plurality of Rx beam schedules from a plurality of sidelink UEs; and transmitting, based at least in part on an occurrence of a triggering condition, a medium access control control element (MAC-CE) associated with the plurality of Rx beam schedules,
wherein the triggering condition is based at least in part on:
a signal received from a peer sidelink UE having a unicast connection with the second sidelink UE,
a signal from a network entity, or
a periodic timer.

28. The method of claim 26, wherein transmitting the sidelink transmission using the Rx beam comprises transmitting the sidelink transmission without a unicast connection setup between the second sidelink UE and the first sidelink UE, or prior to the unicast connection setup between the second sidelink UE and the first sidelink UE.

29. The method of claim 26, wherein the dynamic Rx beam schedule indicates the set of slots in a time window.

30. The method of claim 26, wherein the periodic Rx beam schedule indicates the first sidelink UE is configured to tune to the Rx beams in the set of slots defined with a periodicity in a time window.

* * * * *